United States Patent [19]

Murley et al.

[11] Patent Number: 4,552,717

[45] Date of Patent: Nov. 12, 1985

[54] PROCESS FOR MAKING A THIN WALLED CONTAINER FROM A PLASTIC RESIN

[75] Inventors: Jackie D. Murley, Big Spring; Marion Johnson, Baytown, both of Tex.

[73] Assignee: Cosden Technology, Inc., Dallas, Tex.

[21] Appl. No.: 624,851

[22] Filed: Jun. 26, 1984

[51] Int. Cl.[4] .................................................. B29C 17/04
[52] U.S. Cl. ......................................... 264/549; 264/550
[58] Field of Search ............... 264/547, 549, 550, 551, 264/532

[56] References Cited

U.S. PATENT DOCUMENTS

| | | | |
|---|---|---|---|
| 2,917,783 | 12/1959 | Olson et al. | 264/547 |
| 3,463,844 | 8/1969 | Griffin | 264/549 |
| 4,443,401 | 4/1984 | Turner | 264/550 X |

FOREIGN PATENT DOCUMENTS

| | | | |
|---|---|---|---|
| WO83/01412 | 4/1983 | PCT Int'l Appl. | 264/549 |
| 332588 | 3/1959 | Switzerland | 264/550 |

*Primary Examiner*—Jan Silbaugh
*Attorney, Agent, or Firm*—Roy L. Van Winkle; M. Norwood Cheairs; Michael J. Caddell

[57] ABSTRACT

The process for making thin wall containers from plastic resins described herein includes the step of heating the resin, placing the resin between a product mold and a preform mold, and closing the molds thereon. It also includes the steps of applying a differential pressure across the resin to force the resin into the preform mold and applying pressure on a movable piston in the preform mold that forces the resin relatively into the product mold. As pressure is applied internally of the product being formed, the container is shaped in the desired configuration and during such formation, is biaxially oriented to improve the strength characteristics of the container.

2 Claims, 6 Drawing Figures

PROCESS FOR MAKING A THIN WALLED CONTAINER FROM A PLASTIC RESIN

BACKGROUND OF THE INVENTION

This invention relates generally to a process for making thin-wall containers from sheets of thermoplastic resin. More particularly, but not by way of limitation, this invention relates to a process for blow molding a thin-wall container from a sheet of thermoplastic resin.

Various processes and apparatus have been utilized in the past for forming containers and the like from thermoplastics. A number of these processes utilize a preform member that is placed into a mold and then heated and enlarged, usually by pressure until it reaches the configuration defined by the interior of the mold. Sometimes, the apparatus for expanding the preform member includes a rod or piston that is moved in an axial direction to insure proper elongation of the preform. Containers formed in this method, were, assuming the temperatures to be proper, biaxially oriented, that is, the molecules therein are aligned axially and radially whereby the finished product is substantially stronger than a container of the same configuration that is blow formed at a non-orientation temperature. Such apparatus and procedure are described in U.S. Pat. No. 3,900,120 issued to Thomas F. Sincock on Aug. 19, 1975.

U.S. Pat. No. 3,814,784, which issued June 4, 1974 to William D. Wolf, describes a plug assisted, blow molding procedure wherein a sheet of thermoplastic material is placed across the face of the mold and a low pressure applied to one side of the sheet causing a hemispherical billowing of the sheet. The plug is then brought into engagement with the sheet, forcing the sheet into the product mold. After this occurs, pressure is applied within the mold to cause the plastic to form the final configuration of the container. The expansion of the sheet initially is at a temperature where the resin is in a plasticized state and is accomplished by applying pressure from above. The plastic is then cooled and the plug brought into engagement with the plastic. The temperature of the resin when being forced upwardly by the plug and when being expanded into the final product configuration will be in the orientation temperature range of the particular resin. Thus, the process taught by Wolf produces a product that is a biaxially oriented deep container of relatively thin-walled configuration.

An additional Wolf patent, U.S. Pat. No. 3,737,494, issued June 5, 1973 describes a very similar process and apparatus for producing thin-walled products. It is to be noted that the apparatus taught by Wolf and the process used in his patents are of essentially open mold configuration. When the plunger is forced all the way into the product mold, the periphery of the mold carrying the plunger is brought into sealing engagement with the clamping ring of the upper mold portion to close the mold.

Manifestly, it is highly desirable to form the containers from a sheet since it is possible to form a sheet with multiple layers of materials that include those materials providing the product with high thermal qualities, low temperature qualities, and to provide gas barriers to prevent either the ingress of oxygen into the product contained within the final container or egress from such container of gases such as $CO_2$ from carbonated drinks. It is also highly desirable that the containers be produced in a closed mold configuration since the temperatures thereof can be more carefully controlled and the pressures necessary to the formation and orientation of the product can be more easily attained.

Accordingly, it is the object of this invention to provide an improved apparatus for thermoforming an article from a thermoplastic resin sheet wherein the product is of relatively thin wall, biaxially oriented for strength and formed in a closed mold wherein the desired temperature and pressures can be attained and controlled.

SUMMARY OF THE INVENTION

This invention relates to improved process for making a thin-walled container from a thermoplastic resin sheet comprising the steps of: heating said sheet; positioning said sheet between a pre-form mold and an article mold aligned with said pre-form mold; closing said molds on said sheet; introducing gas pressure into said article mold displacing said sheet into said pre-form mold; and, introducing gas into said preform mold to displace said sheet and displacing a pressure responsive piston into said article mold to form said article while biaxially orienting said resin and maintaining a thin wall in said article.

BRIEF DESCRIPTION OF THE DRAWING

The foregoing and additional objects and advantages of the invention will become more apparent as the following detailed description is read in conjunction with the accompanying drawing wherein like reference characters denote like parts in all views and wherein.

DETAILED DESCRIPTION OF THE PREFERRED EMBODIMENT

Figure 1:
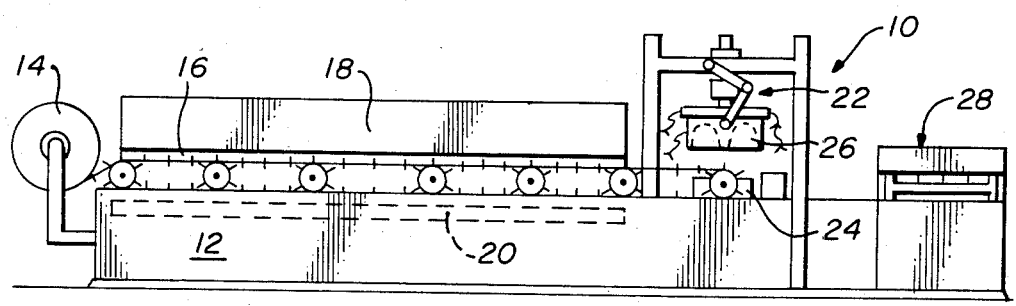
FIG. 1 is a schematic, elevational view illustrating apparatus for carrying out the process of the invention.

Referring to the drawing, and FIG. 1 in particular, shown therein and generally designated by the reference character 10 is apparatus for producing containers from a sheet of thermoplastic resin according to the process of this invention. The apparatus 10 includes a base 12 carrying a roll of thermoplastic resin 14 in sheet form at one end thereof and including a conveyor 16 for moving the sheet resin 14 along the base 12. Above the conveyor 16 is a heater 18 and below the conveyor 16, and shown in dash lines, is a second heater 20. The heaters 18 and 20 are utilized to raise the temperature of the thermoplastic resin sheet 14 to the desired temperature for thermoforming before the sheet reaches a mold assembly 22.

The mold assembly 22 includes a preform mold platen 24 and a product mold platen 26. The product mold platen 26 and preform mold platen 24 are movable toward and away from each other for purposes that will be described hereinafter. To the right of the mold assembly 22, as illustrated in FIG. 1, is a trimming assembly 28 which receives the sheet 16 after it has been formed in the mold assembly 22 and trims the containers that are formed in the mold assembly 22 from the resin sheet 14.

Figure 2:
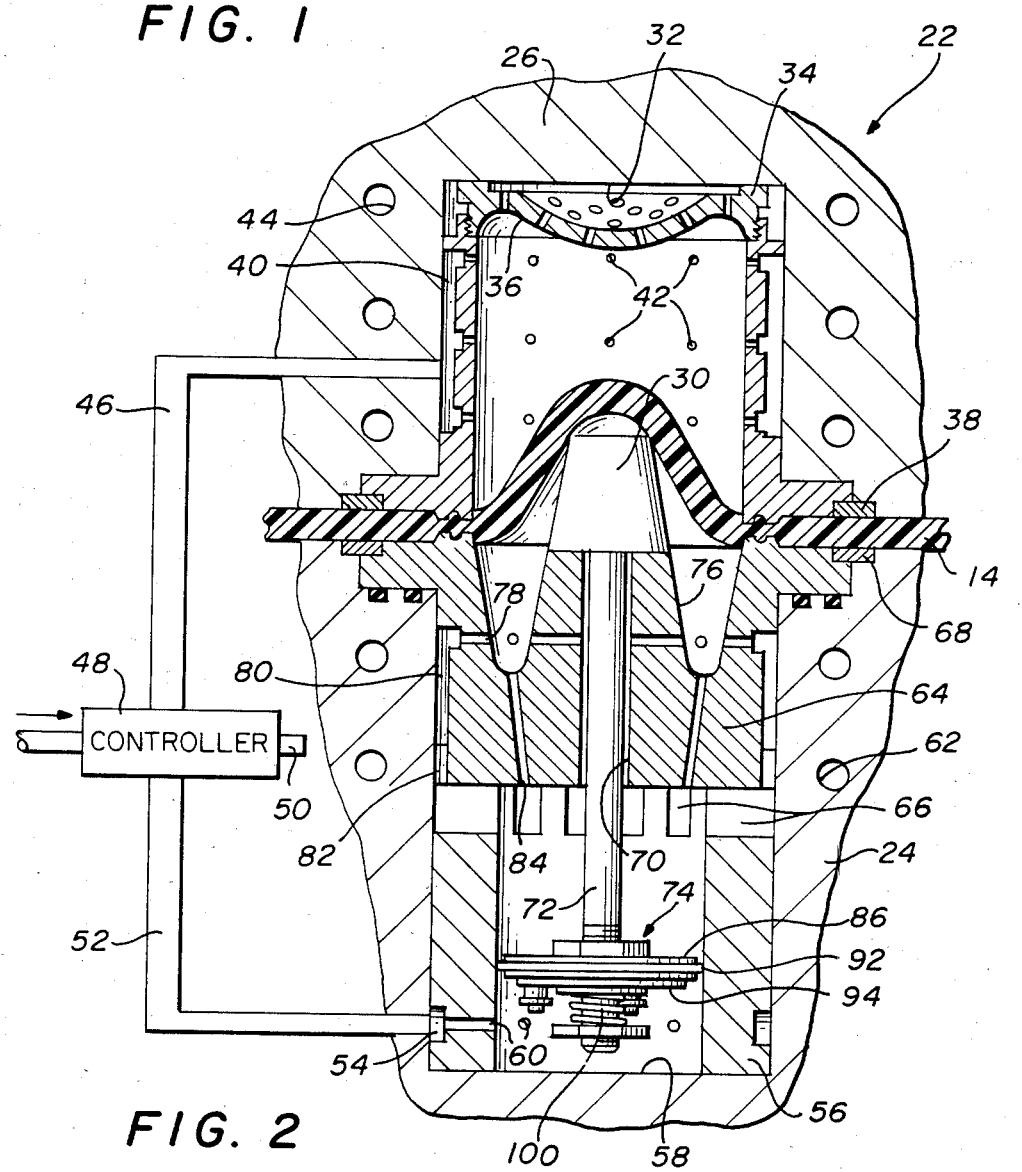
FIG. 2 is an enlarged, fragmentary cross-sectional view illustrating details of construction of the product and of the preform mold that are constructed in accordance with the invention.

As illustrated in FIG. 2, the resin sheet 14 has been moved into position between the product mold platen 26 and the preform mold platen 24. The platens 24 and 26 have been closed, that is, they have been moved toward each other so that they engage and hold the resin sheet 14 therebetween. It will be noted that the sheet 14, which has been previously heated by the heaters 18 and 20, is distorted when the platens are closed by a piston head 30 that is illustrated projecting upwardly into the product mold platen 26. The head 30 may not extend, in its lowered position, into the product mold platen 26 depending upon the type of product.

As shown in FIG. 2, the product mold platen 26 includes a cavity 32 in which there is disposed a product mold 34 having an interior wall 36 that is configured in such a manner as to produce a final product having the desired shape. The product mold 34 is retained in the cavity 32 by a lock ring 38 of any suitable type.

The product mold 34 is formed so that a space 40 exists between the wall of the cavity 32 and the exterior of the product mold 34. A plurality of ports 42 extend through the wall of the mold 34 providing communication between the space 40 and the interior of the mold 34. The product mold platen 26 is provided with a plurality of passageways 44 that provide for the flow of hot water, air, or any other suitable medium to control the temperature of the platen 26 and of the product mold 34.

The platen 26 is also be provided with a suitable gas flow passageway 46 that is in communication with the space 40 to provide for the pressurization or venting of the mold 34 as is needed in the molding process. The passageways 46 are connected with a controller 48, which may be of any suitable type to provide for the pressurization or venting of the mold 34 at the appropriate time. The controller 48 will, of course, be connected to a source of gas under pressure (not shown) and will be provided with an exhaust 50 so that gases can be vented when needed.

The controller is also connected with a passageway 52 that leads to an annular space 54 encircling a cylinder insert 56. The insert 56 is located in a mold cavity 58 formed in the preform mold platen 24. A plurality of ports 60 extend through the wall of the insert 56 providing a connection with the annular space 54 and thus providing for the entrance of pressurized gas into the cavity 58 or for the exit of gas therefrom during venting of the cavity 58.

The preform mold platen 24 is also provided with a plurality of passageways 62 that are appropriately located to provide for heating of a preform mold 64 that is positioned in the cavity 58. The lower end of the preform mold 64 abuts the cylinder insert 56 adjacent to a plurality of radially extending slots 66 formed in the upper end of the cylinder insert 56. The preform mold 64 is retained in the platen 24 by a suitable lock ring 68.

The preform mold 64 includes an axial bore 70 that slidably receives a connecting rod 72 which extends from the previously mentioned piston head 30 to a valve assembly 74 that is mounted within the insert 58. The valve assembly 74 will be described more completely in connection with the description of FIG. 3.

The preform mold 64 includes an interior wall 76 that, in cross section, has a shape somewhat resembling the letter "W". A plurality of ports 78 extend through the wall 76 of the preform mold 64 communicating with an annular space 80 that is also in communication with a cavity 58 through slots 82 formed in the lower end of the preform mold 64 and through the slots 66 in the cylinder insert 56. A plurality of ports 84 also provide for the direct communication between the interior of the preform mold 64 and the cavity 58.

Figure 3:
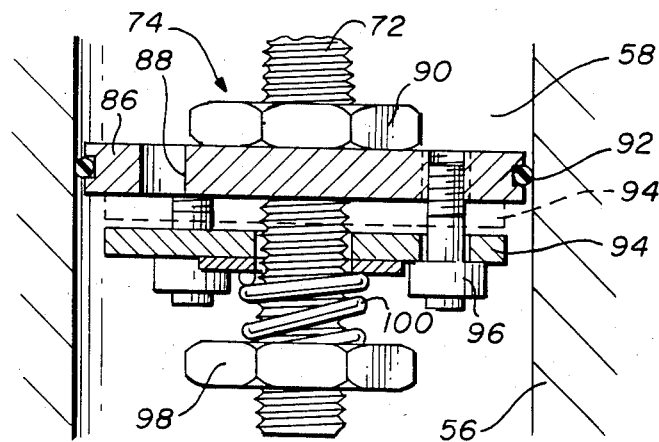
FIG. 3 is an enlarged fragmentary view illustrating the structure of a one-way valve that is utilized in the apparatus of FIG. 2.

Referring to FIG. 3, the valve assembly 74, which is attached to the lower end of the piston rod 72, can be seen in more detail. As shown therein, the valve assembly 74 includes a disc 86 having a plurality of openings 88 extending therethrough. The disc 86 is retained on the piston rod 72 by threaded nuts 90. Encircling the disc 86 is an annular seal 92 that is disposed in sliding and sealing engagement with the interior of the cylinder insert 56.

To provide for the opening and closing of the valve openings 88, a valve member 94 is located on the rod 72 and is slidable thereon into the position illustrated by dash lines to prevent flow through the valve openings 88. The valve member 94 is limited in its movement by a plurality of threaded fasteners 96 that are threaded into the valve disc 86. To urge the valve plate 94 constantly toward the closed position (as shown in dash lines) that is, toward the position wherein flow cannot occur through the openings 88, a second threaded nut 98 is located on the rod 72 and a compression spring 100 is located between and in engagement with the nut 98 and the valve plate 94.

OPERATION

In the operation of the apparatus 10 and the production of a thin-walled, deep drawn container product the sheet resin 14 is carried by the conveyor 16 between the heaters 18 and 20 where the temperature thereof is raised to a point just below the crystalline melting temperature, but above the glass transition temperature, of the particular plastic being used. When the resin sheet 14 reaches the mold assembly 22, the conveyor 16 is stopped and the platens 24 and 26 are brought together as illustrated in FIG. 2. As shown therein, the piston head 30 is in engagement with the sheet 14, forcing it upwardly into the cavity 32 of the product mold platen 26. At this time, there is no pressure in either the cavity 32 of the product mold platen 26 or in the cavity 58 in the preform mold platen 24.

The controller 48 directs gas under pressure through the conduit 46 into the space 40 of the platen 26. Gas in the space 40 enters the interior of the product mold 34 through the ports 42 therein, forcing the sheet 14 within the cavity 32 into the configuration illustrated in FIG. 4. As shown, the sheet 14 thins slightly as it is deformed into engagement with the interior sidewall 76 of the preform mold 64.

As the sheet 14 is forced into the preform mold 64, gas trapped therein is directed outwardly through the ports 78 and 84. Gas flowing through the ports 78 enters the space 80 on the exterior of the preform mold 64 passing through the slots 82 therein and through the slots 66 into the cylinder liner 56. Gas being forced outwardly through the ports 84 enters directly into the cylinder liner 56 and when combined with the gas coming in through the slots 56 may cause the valve plate 94 to move downwardly away from the disc 86, permitting some gas to vent outwardly through the ports 60 and the passageway 52 to exhaust. Due to the wide range and thicknesses of thermoplastic materials that can be used, the pressures within the product mold cavity 32 may range from 30 to as much as 450 psi.

Figure 4:
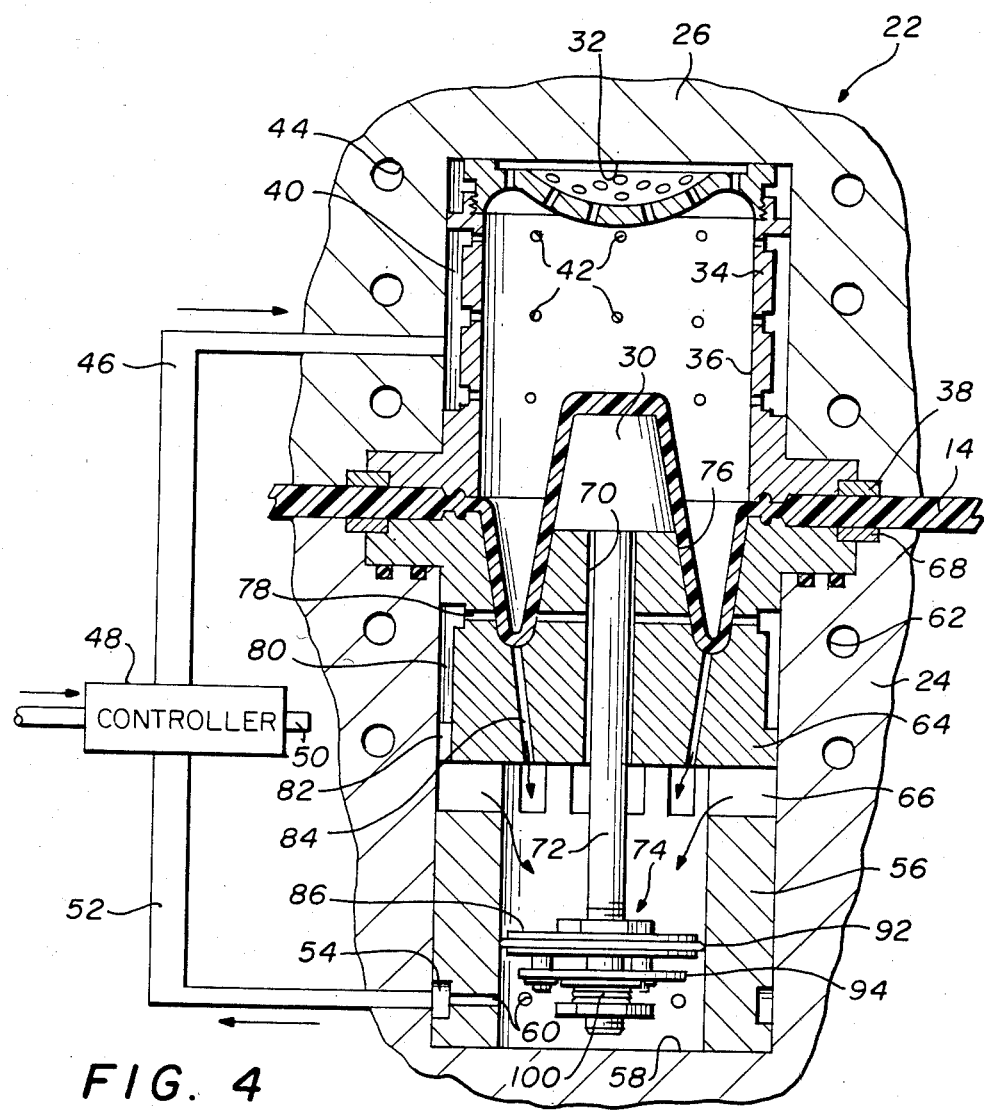
FIG. 4 is a view similar to FIG. 2 showing the apparatus in another stage of operation.

It should also be pointed out that during this stage of the process, water or other suitable medium is being conveyed through the passageways 44 in the product mold platen 26 and through the passageway 62 in the preform mold platen 24 to control the resin temperature. Generally heat must be added to prevent the resin from cooling too much. Also, in normal practice, the gas, which is generally air, is heated prior to being introduced into the mold cavities. The molds are usually heated from about 75° C. to about 115° C. When the sheet 14 has been displaced into the preform mold 64 as shown in FIG. 4, the initial step of the process of forming the product has been completed.

Figure 5:
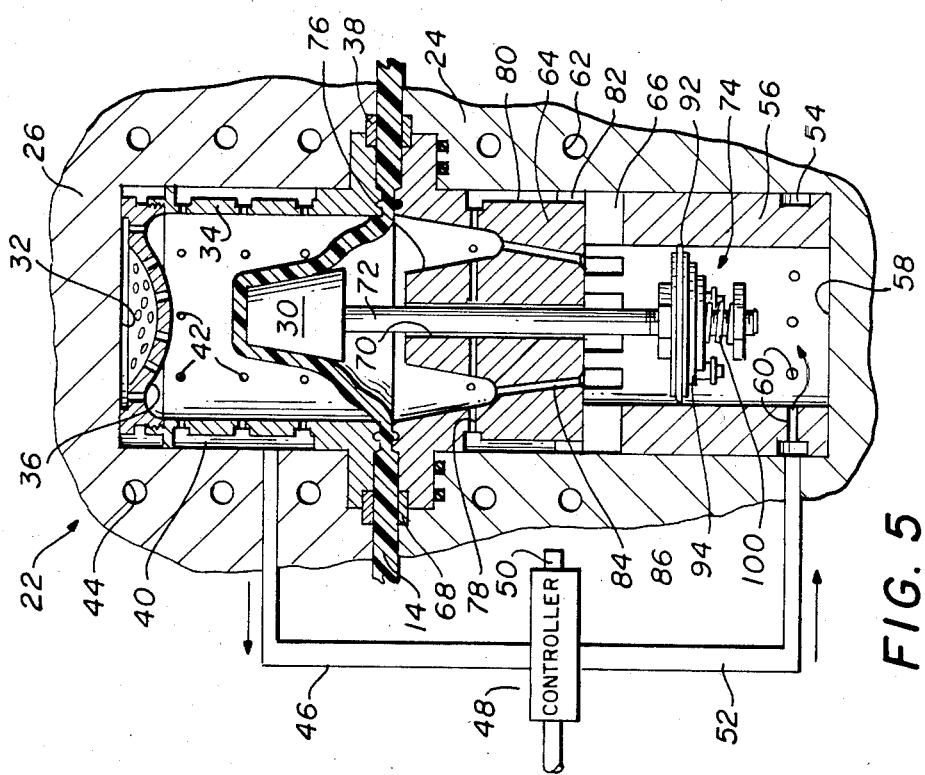
FIG. 5 is also a view similar to FIG. 2, but showing the apparatus in still another stage of operation.

With the temperature of the sheet 14 within the mold assembly 22 being controlled at the proper orientation temperature for the particular resin being used, the controller 48 opens the passageway 46 to vent the cavity 32 and the interior of the product mold 34 to atmosphere through the ports 42 therein. The controller 48 also directs gas under pressure through the passageway 52, the annular space 54 in the cylinder liner 56 and through the ports 60 into the cavity 58 relatively below the valve assembly 74. Thus, a higher pressure exists below the valve assembly 74 than above and this, coupled with the force of the spring 100, closes the valve 74. The differential in pressure across the valve assembly 74 is sufficient to drive the connecting rod 72 and the piston head 30 upwardly as shown in FIG. 5. Again, and due to the differences in resins, resin thickness, etc., the pressure may vary from 30 to 300 psi.

Orientation temperature ranges for several commonly used thermoplastic resins are: for polyethylene therephthalate about 90° C. to 100° C.; for polypropylene about 100° C. to 160° C.; and for polyethylene about 50° C. to 130° C. Each resin has its own temperature range wherein orientation is possible.

As the piston head 30 is being displaced upwardly, gas contained in the chamber 58 above the valve assembly 74 is also displaced thereby into the interior of the preform mold 64 so that the sheet 14 begins to assume the configuration illustrated in FIG. 5. It will be appreciated that as the piston head 30 is driven upwardly, the resin sheet 14 is stressed in an axial direction and, due to the pressure within the interior of the preform mold 64, the sheet 14 is stressed radially. Thus, the resin sheet 14 is being subjected to both axial and radial orientation which, as previously mentioned, substantially increases the strength of the final product.

The foregoing movement continues until such time as the valve assembly 74, that is, the seal ring 92 thereon, moves past the lower edges of the slots 66 in the cylinder liner 56. When this occurs, upward movement of the piston head 34 is arrested and the pressurized gas in the cavity 58 enters the interior of the preform mold 64 and the interior of the now substantially deformed sheet 14 through the ports 84 and 78. When this happens, the sheet 14 is forced against the interior wall 36 of the mold 34 taking on the final configuration of the product that is to be made. It will, of course, be observed that sheet 14 has now been stressed to the maximum permitted by the mold 34 and thus has received the maximum amount of molecular biaxial orientation that is possible in the product being produced.

Figure 6:
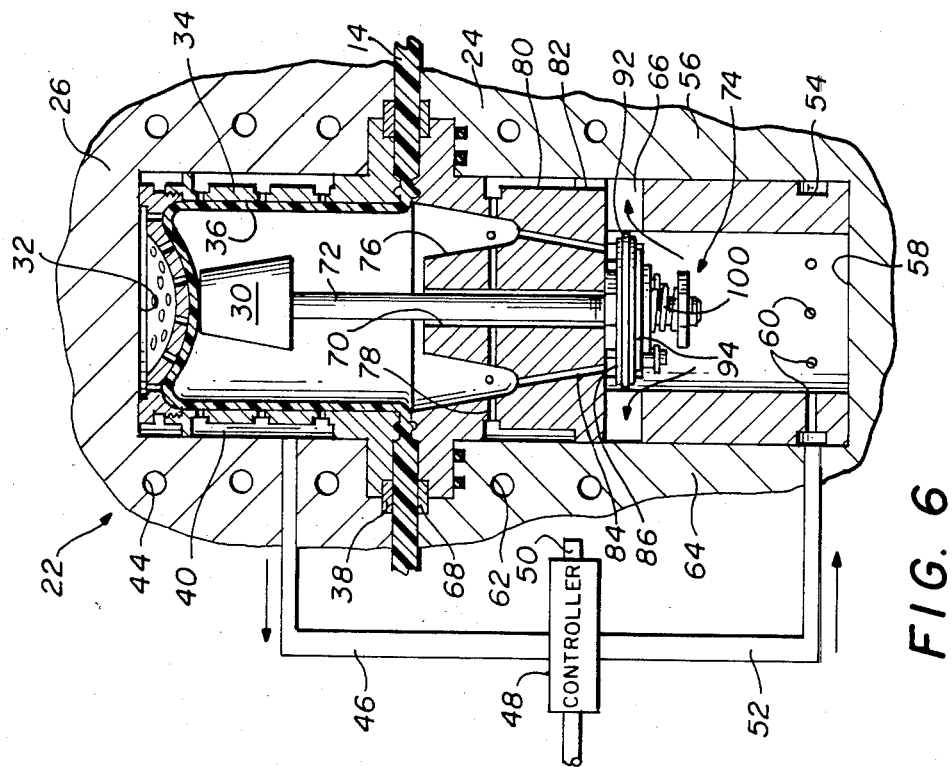
FIG. 6 is a view similar to FIG. 2, but illustrating the apparatus in the final stage of producing a thin wall container.

Once the sheet 14 has reached the configuration illustrated in FIG. 6, and the pressures have equalized in the cavity 58 and in the interior of the product formed by the sheet 14 as shown in FIG. 6, 38, the piston head 30, connecting rod 72 and valve assembly 74 may drop downwardly past the lower edges of the slots 66. If and when this occurs, it will be necessary to vent the cavity 58 through the passageway 52 to vent the interior of the product formed in the product mold 34 through the opening of the valve assembly 74 thereby preventing the rapid escape of pressurized gas when the platens 24 and 26 are parted to remove the product. When the platens are separated, the sheet 14, with the thin wall product formed therein, is conveyed to the trimming apparatus 28 wherein the product is trimmed from the sheets 14.

From the foregoing, it will be appreciated that the apparatus and the process described hereinbefore will produce deep drawn, thin wall, product such as containers that have been biaxially oriented for strength. The apparatus and process efficiently and accurately produce the products while maintaining the necessary temperatures and pressures to perform the desired functions in a closed mold configuration.

It will be understood that the foregoing is presented by way of example only and that many modifications and changes can be made thereto without departing from the spirit or scope of the annexed claims.

What we claim is:

1. An improved process for making a thinwalled container from a sheet of thermoplastic resin comprising the steps of:
   heating said sheet,
   positioning said sheet between a pre-form mold having a cavity and an article mold aligned with said pre-form mold cavity;
   closing said molds on said sheet;
   introducing gas into said article mold cavity displacing said sheet into said pre-form mold cavity;
   introducing gas into a chamber remote from said pre-form mold cavity to move a piston slidably located in said pre-form mold toward said sheet to displace said sheet partially into said article mold cavity; and,
   establishing communication through an opening in a sidewall of said chamber between said gas in said chamber and said pre-form mold cavity on the piston side of said sheet as said piston approaches the end of its travel and thereby introducing said gas from said chamber through said opening and into said pre-form mold cavity to displace said sheet into said article mold cavity to cause said sheet to conform to said article mold forming said article while biaxially orienting said resin and maintaining a thin-walled article.

2. The process of claim 1 and also including returning said piston to its initial position when the gas pressure on the piston side of said sheet substantially equals the gas pressure in said remotely located chamber.

* * * * *